No. 873,734.
PATENTED DEC. 17, 1907.
L. A. DÉSY.
EXCAVATOR SCRAPER.
APPLICATION FILED FEB. 6, 1907.
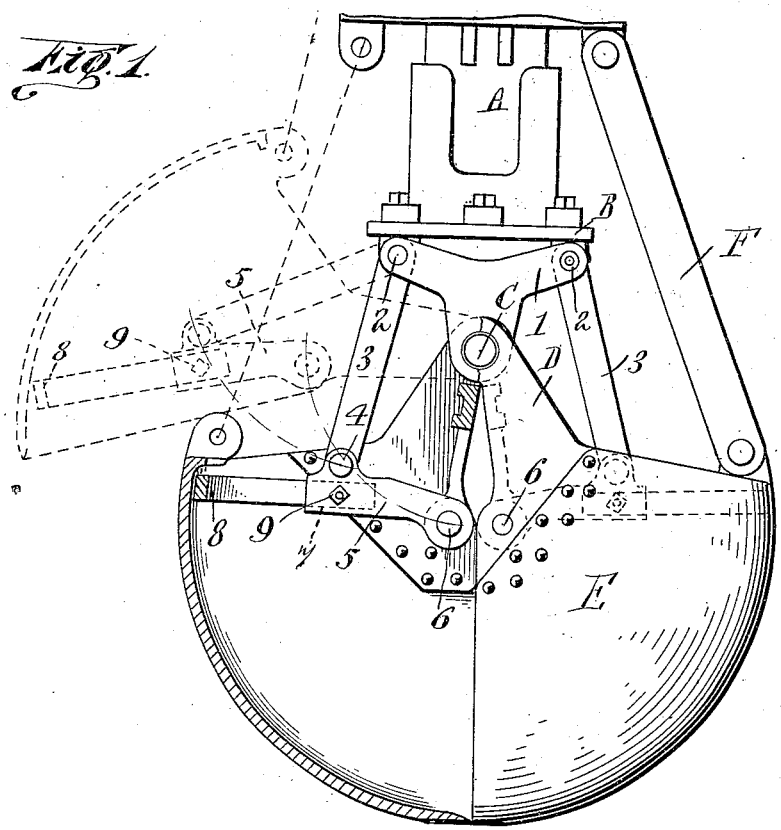
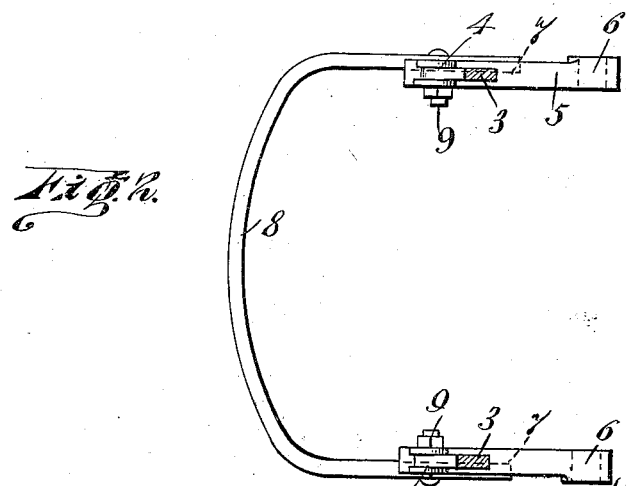
Witnesses:
Louis A. Désy,
Inventor,
By Marion & Marion
Attorneys

UNITED STATES PATENT OFFICE.

LOUIS ARSÉNE DÉSY, OF MONTREAL, QUEBEC, CANADA, ASSIGNOR TO JOSEPH WILLIAM HARRIS, OF MONTREAL, CANADA.

EXCAVATOR-SCRAPER.

No. 873,734.	Specification of Letters Patent.	Patented Dec. 17, 1907.

Application filed February 6, 1907. Serial No. 356,117.

*To all whom it may concern:*

Be it known that I, LOUIS ARSÉNE DÉSY, a subject of the King of Great Britain, residing at the city and District of Montreal, in the Province of Quebec, Canada, have invented certain new and useful Improvements in Excavator-Scrapers; and I do hereby declare that the following is a full, clear, and exact description of the invention, such as will enable others skilled in the art to which it appertains to make and use the same.

My invention relates to excavator scrapers; the object of my invention is to provide a scraper adapted for use in connection with an ordinary form of excavator bucket for the purpose of scraping from the leaves of the bucket the material being dug, so that the bucket is cleaned every time it is opened or closed; and my invention consists of the construction, combination and arrangement of parts, as herein illustrated, described and claimed.

In the accompanying drawings, forming part of this application, I have illustrated one form of embodiment of this invention, in which drawings similar reference characters designate corresponding parts, and in which:

Figure 1 is a side elevation, partly in section, showing the application of my invention to a clam shell bucket; and, Fig. 2 is a horizontal section through the scraper actuating links, showing the scraper in plan.

Referring to the drawings, A designates a beam having a shoe B on its lower end, provided with bolts C. The castings D, to which are secured the leaves E of the bucket, are pivotally disposed on the bolts C. The links F are adapted to actuate the bucket into the position shown in dotted lines in Fig. 1. All of this construction may be of any common and well known form. The shoe B is provided with brackets 1 carrying the pintles or pins 2, to which are connected the upper ends of the links 3, the lower ends of the links being pivoted as at 4 to the arms 5, which arms are pivoted as at 6 to the castings D of the bucket. The arms 5 are provided with sockets 7, adapted to receive the ends of the yokes 8, which yokes extend to and are adapted to scrape the inner walls of the leaves E. The ends of the yokes 8 are adjustably held in the sockets 7 by means of the insertible members 9, which may be bolts or set-screws.

The bucket being in the position shown in full lines in Fig. 1, the yokes 8 will rest adjacent the upper edges of the leaves E. The bucket being actuated to the position shown in dotted lines in Fig. 1, the movement of the yokes 8 will be limited against the same length of movement as the leaves E, so that, as the yokes move with the leaves they will travel over the inner face of the leaves to clean the same when the leaves are actuated to the dotted line position. This movement of the yokes is reversed when the bucket is closed, so that the yokes travel over the leaves twice in the operation of opening and closing. The link connections 3 between the arms 5 and the pins 2 force the yoke 8 to travel through a much shorter arc than that traversed by the bucket leaves upon which they operate. Due to this limitation of their movements, the yokes 8 scrape the leaves over which they pass thoroughly both as the bucket opens and closes.

Having thus fully described my invention, what I claim as new, and desire to secure by Letters Patent, is:—

1. In combination with an excavator bucket having a plurality of leaves, means connected with each of the leaves for scraping the inner wall of the bucket when the bucket is operated.

2. In combination with an excavator bucket comprising a plurality of leaves having means for opening and closing leaves, a scraper connected with each of the leaves and adapted to be moved over the leaves of the bucket when they are opened or closed.

3. In combination with a bucket having pivoted sides and means for swinging the sides on their pivots, arms pivoted to the sides of the bucket, scrapers carried by the arms, and means for limiting the movement of the arms when the sides are moved.

4. In combination with a bucket having pivoted sides and means for swinging the sides on their pivots, arms pivoted to the sides of the bucket, yoke-shaped scrapers carried by the arms, and means for limiting the movement of the arms when the sides are moved.

5. In combination with a bucket having pivoted sides and means for swinging the sides on their pivots, arms pivoted to the sides of the bucket and provided with sockets, yoke-shaped scrapers having their ends disposed in the sockets, means for adjustably securing the ends in the sockets, and means for limiting the movement of the arms when the sides are moved.

6. In combination with a bucket having pivoted sides and means for swinging the sides on their pivots, arms pivoted to the sides of the bucket and provided with sockets, yoke-shaped scrapers having their ends disposed in the sockets, insertible members disposed through the sockets and the ends of the yokes, and means for limiting the movement of the arms when the sides are moved.

7. In combination with a bucket having pivoted sides and means for swinging the sides on their pivots, arms pivoted to the sides of the bucket, scrapers carried by the arms, links pivoted at one end to the arms, and a fixed pivotal support for the opposite ends of the links.

8. In an excavator, the combination of a beam having a shoe on its lower end provided with lugs, a bucket having its sides pivoted to the shoe, means for swinging the sides of the bucket, arms pivoted to the sides of the bucket, scrapers carried by the arms, and links having their opposite ends pivoted respectively to the arms and the lugs on said shoe.

9. In combination with a multipart excavator bucket, means for scraping the inner wall of the bucket when its parts are moved.

10. In combination with a multileaved excavator bucket, a scraper carried by each of the leaves, and arranged to operate by the movement of the leaves.

11. In combination with a multileaved excavator bucket, a scraper carried by each of the leaves, and each arranged to be independently operated by the movement of its corresponding leaf.

In witness whereof I have hereunto set my hand in the presence of two witnesses.

LOUIS ARSÈNE DÉSY.

Witnesses:
C. C. COUSINS,
E. M. SLINEY.